United States Patent [19]

Dye

[11] Patent Number: 4,966,396

[45] Date of Patent: Oct. 30, 1990

[54] CONNECTION DEVICE

[75] Inventor: John F. Dye, Bridgewater, Mass.

[73] Assignee: Kendall Company

[21] Appl. No.: 337,606

[22] Filed: Apr. 13, 1989

[51] Int. Cl.[5] .............. F16L 39/00

[52] U.S. Cl. .............. 285/136; 285/423

[58] Field of Search .............. 285/134, 136, 423

[56] References Cited

U.S. PATENT DOCUMENTS

| | | | |
|---|---|---|---|
| 2,781,134 | 2/1957 | Weir et al. | 285/136 X |
| 2,820,650 | 1/1958 | Leopold | 285/134 |
| 3,862,629 | 1/1975 | Rotta | 128/24 |
| 4,013,069 | 3/1977 | Hasty | 128/24 |
| 4,030,488 | 6/1977 | Hasty | 128/24 |
| 4,250,918 | 2/1981 | Tuson et al. | 285/136 X |
| 4,320,746 | 3/1982 | Arkans | 128/24 |
| 4,338,923 | 7/1982 | Gelfer et al. | 128/24 |
| 4,402,312 | 9/1983 | Villari et al. | 128/24 |

FOREIGN PATENT DOCUMENTS

| | | | |
|---|---|---|---|
| 48-050 | 12/1972 | Japan | 285/136 |

*Primary Examiner*—Dave W. Arola

[57] ABSTRACT

A connection device having an intermediate member, a first connector, and a second connector. The first and second connectors are releasably retained to the intermediate member, and the first and second connectors are rotatable with respect to the intermediate member. The first and second connectors have a plurality of separate annular channels, and the intermediate member has a plurality of annular channels. The channels of the first and second connectors communicate with the channels of the intermediate member in all rotatable positions of the first and second connectors, such that fluid may be passed through the separate channels of the intermediate member into the separate channels of the first and second connectors.

8 Claims, 2 Drawing Sheets

CONNECTION DEVICE

BACKGROUND OF THE INVENTION

The present invention relates to a connection device for connecting a source of fluid with a plurality of chambers in a pair of sleeves.

The velocity of the flow of blood in a patient's limbs markedly decreases during the confinement of the patient. This decrease in the velocity of blood in the extremities causes a pooling or stasis of blood which is particularly pronounced during surgery, immediately after surgery, and when the patient has been confined to bed for extended periods of time. This stasis of blood is a significant cause of the formation of thrombi in the patient's extremities which may have a severe deleterious effect on the patient. Additionally, in certain patients, it is desirable to move fluid out of interstitial spaces in the tissues of the extremities, in order to reduce the swelling associated with edema in the extremities, or for the treatment of ulcers caused by insufficient venous return.

In the past, a sequential intermittent compression device, such as disclosed in U.S. Pat. No. 4,013,069 incorporated herein by reference, applies compressive pressures from a source of fluid against the patient's limb by sleeves having a plurality of chambers.

However, it is found that it is frequently desirable to facilitate the connection of the sleeves to a controller in the compression device for applying the compressive pressures from the source of fluid. Compression devices concerning the flow of blood are also disclosed in U.S. Pat. Nos. 4,013,069; 4,338,923; 3,862,629; 4,030,488; 4,402,312; and 4,320,746, incorporated herein by reference.

SUMMARY OF THE INVENTION

A principal feature of the present invention is the provision of an improved connection device of simplified construction for connecting a source of fluid to the chambers in a plurality of sleeves.

The connection device of the present invention comprises an intermediate member having a pair of opposed first and second sides, and a plurality of spaced annular walls defining a plurality of separate annular channels extending substantially peripherally around the intermediate member, and first and second walls covering the opposed first and second sides of the intermediate member and closing the channels of the intermediate member, with each of the walls having opening means extending therethrough and separately communicating with each of the channels of the intermediate member. The device has a plurality of first conduit separately communicating with each of the channels of the intermediate member to permit passage of fluid to the channels. The device has a first connector positioned adjacent the first wall and having a plurality of annular walls defining separate annular channels extending substantially peripherally around the first connector, with each of the channels of the first connector separately communicating with the opening means of the first wall such that the channels of the first connector separately communicate with the channels of the intermediate member, with the first connector being rotatable with respect to the intermediate member. The device has a plurality of second conduits separately communicating with each of the channels of the first connector to permit passage of fluid from the channels. The device has a second connector positioned adjacent the second wall and having a plurality of annular walls defining separate annular channels extending substantially peripherally around the second connector, with each of the channels of the second connector separately communicating with the opening means of the second wall such that the channels of the second connector separately communicate with the channels of the intermediate member, with the second connector being rotatable with respect to the intermediate member. The device has a plurality of third conduits separately communicating with each of the channels of the second connector to permit passage of fluid from the channels. A feature of the invention is that the device has means for releasably retaining the first connector at a plurality of positions relative to the intermediate member, and means for releasably retaining the second connector at a plurality of positions relative to the intermediate member.

Another feature of the present invention is that the connector may be readily assembled and disassembled in order to connect or disconnect a sleeve which is attached to the first and second connector.

Thus, another feature of the invention is that the first and second connectors may be rotated to a desired position relative to the intermediate member and retained in place.

Still another feature of the invention is the first and second walls comprise elastic members in order to provide seals between the intermediate member and the first and second connectors.

Further features will become more fully apparent in the following description of the embodiments of this invention and from the appended claims.

DESCRIPTION OF THE PREFERRED EMBODIMENTS

Figure 1:
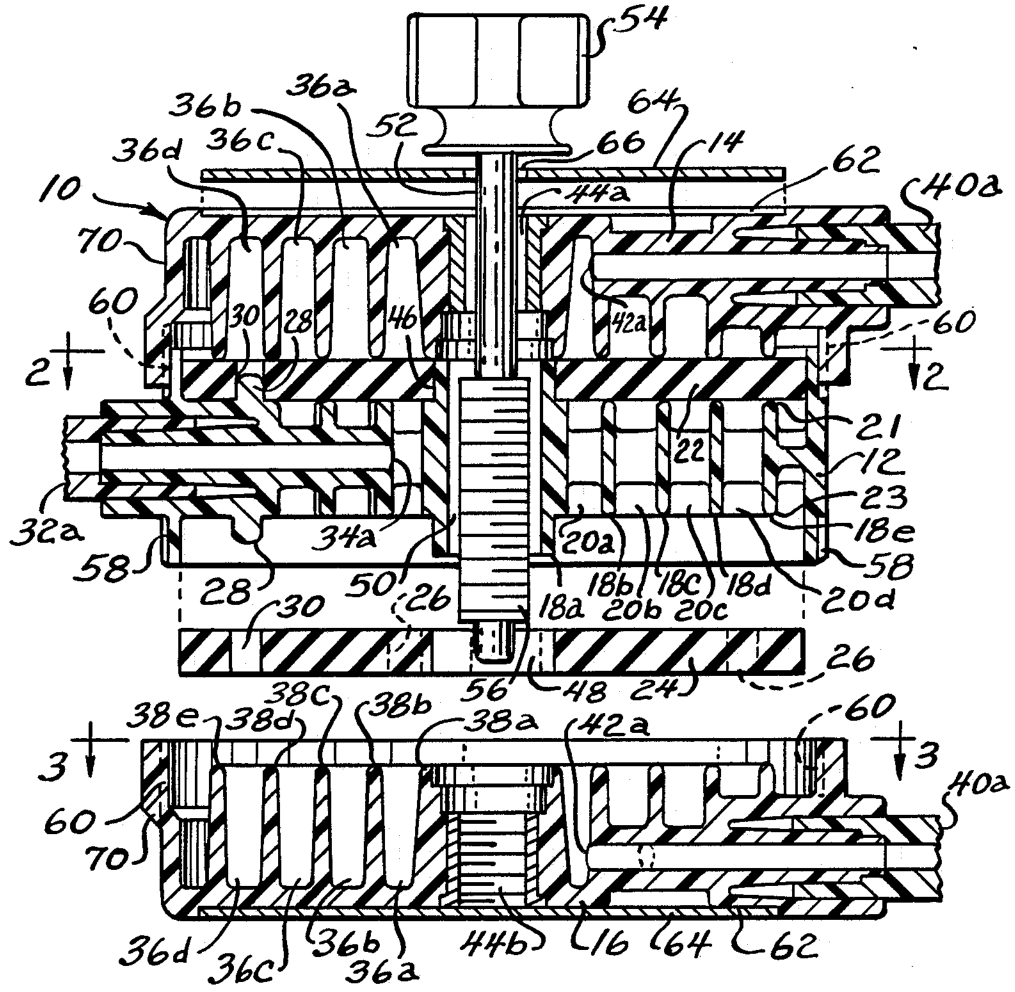
FIG. 1 is a sectional view of a connection device of the present invention.
Figure 2:
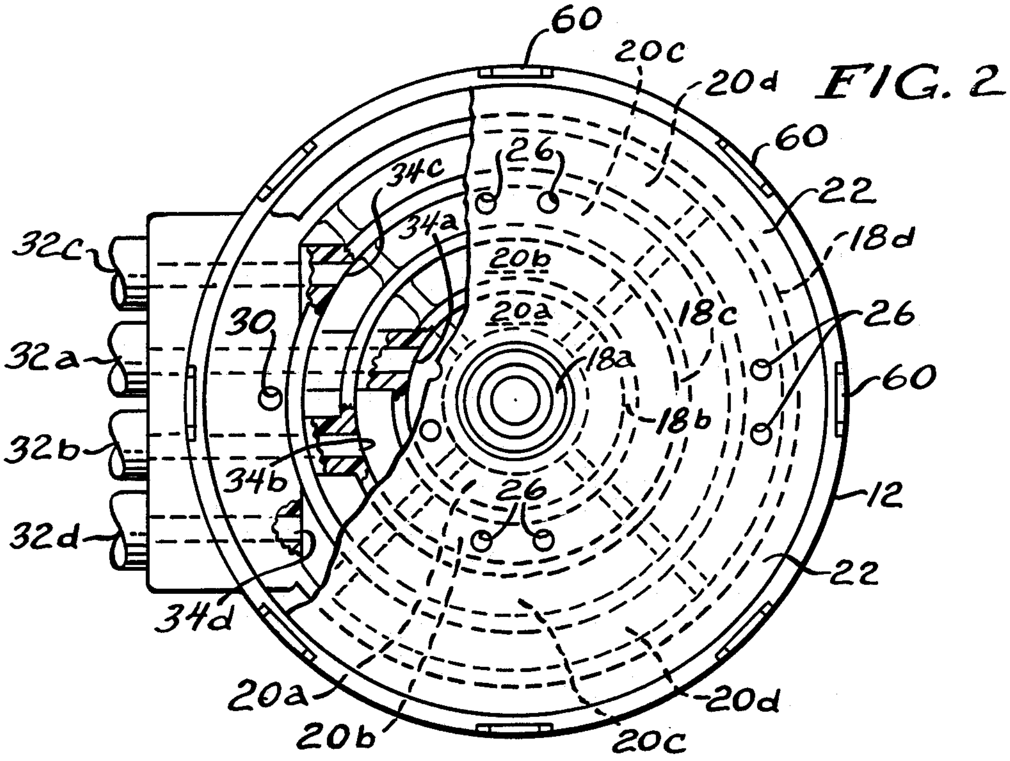
FIG. 2 is a fragmentary plan view of an intermediate member, taken partly in section, and taken substantially as indicated along the line 2-2 of FIG. 1.
Figure 3:
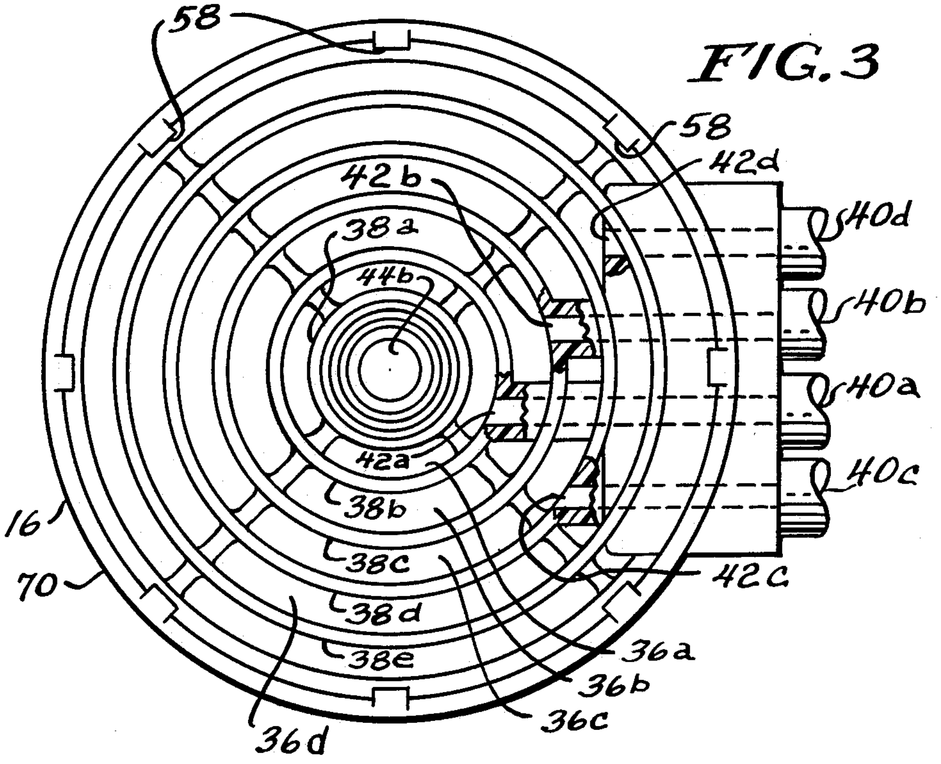
FIG. 3 is a fragmentary plan view of a connector, taken partly in section, and taken substantially as indicated along the line 3—3 of FIG. 1.

Referring now to FIGS. 1–3, there is shown a connection device generally designated 10 having an intermediate member 12, a first connector 14, and a second connector 16. The intermediate member 12 has a pair of opposed first and second sides 21 and 23, and a plurality of spaced annular walls **18*a*, 18*b*, 18*c*, 18*d*, and 18*e* defining a plurality of separate annular channels 20*a*, 20*b*, 20*c*, and 20*d* extending substantially peripherally around the intermediate member 12. The intermediate member 12 has first and second generally circular elastic walls 22 and 24 covering the opposed sides 21 and 23 of the intermediate member 12 and enclosing the channels 20*a*, 20*b*, 20*c*, and 20*d*. As shown, the walls 22 and 24 have a plurality of openings 26 extending therethrough separately communicating with each of the channels 20*a*, 20*b*, 20*c*, and 20*d* of the intermediate member 12. Also, the intermediate member 12 has a pair of opposed bosses 28 which are received in apertures 30 of the first and second walls 22 and 24 in order to retain the first and second walls 22 and 24 in place on the intermediate member 12**. In this configuration at least one of the openings 26 in both the walls 22 and 24 communicate with each of the channels 20*a*, 20*b*, 20*c*, and 20*d* in the intermediate member 12.

The intermediate member 12 has a plurality of conduits 32*a*, 32*b*, 32*c* and 32*d* including associated passageways in the intermediate member 12 which communicate with a source of fluid which passes through the conduits 32*a*, *b*, *c*, and *d* and separate ports 34*a*, 34*b*, 34*c*, and 34*d* into the channels 20*a*, 20*b*, 20*c*, and 20*d*.

The connection device 10 has a first connector 14 adjacent the first wall 22, and a second connector 16 adjacent the second wall 24. Since the first and second connectors 14 and 16 are substantially identical in structure, and like reference numerals will designate like parts in the connectors 14 and 16. The first and second connectors 14 and 16 have a plurality of separate annular walls 38*a*, 38*b*, 38*c*, 38*d* and 38*e* defining separate annular channels 36*a*, 36*b*, 36*c*, and 36*d* extending substantially peripherally around the connector 14 and 16. Each of the channels 36*a*, *b*, *c*, and *d* of the first connector 14 separately communicate with the openings 26 of the first wall 22 associated with the channels 20*a*, 20*b*, 20*c*, and 20*d* of the intermediate member 12. Similarly, each of the channels 36*a*, *b*, *c*, and *d* of the second connector 16 separately communicate with the openings 36 of the second wall 24 such that the channels 36*a*, *b*, *c*, and *d* of the second connector 16 communicate with the channels 20*a*, *b*, *c*, and *d* of the intermediate member 12.

The first and second connectors 14 and 16 have a plurality of conduits 40*a*, *b*, *c*, and *d* which communicate through respective ports 42*a*, *b*, *c*, and *d* with the separate channels 36*a*, *b*, *c*, and *d*.

Thus, in use, the fluid under pressure passes through the conduits 32*a*, *b*, *c*, and *d* into the channels 20*a*, *b*, *c*, and *d* of the intermediate member 12, through the openings 26 of the walls 22 and 24 into the channels 36*a*, *b*, *c*, and *d* of the first and second connectors 14 and 16 and through the conduits 40*a*, *b*, *c*, and *d* into separate chambers of a pair of sleeves, with each sleeve being associated with one of the connectors 14 and 16.

The first and second connectors 14 and 16 have a bore 44*a* and 44*b*, respectively, extending therethrough, the first and second walls 22 and 24 have bores 46 and 48, extending therethrough, and the wall 18*a* of the intermediate member 12 has a bore 50 extending therethrough. The connection device 10 has an elongated bolt 52 having a knob 54 at one end, and a threaded portion 56 adjacent the other end, with the bore 44*b* of the second connector 16 being threaded to receive the threaded portion 56 of the bolt 52, such that the bolt 52 may be utilized to releasably assemble the first and second connectors 14 and 16 to the intermediate member 12 while permitting rotation of the first and second connectors 14 and 16 relative to the intermediate member 12. However, in all rotational positions of the first and second connectors 14 and 16, the channels 20*a*, *b*, *c*, and *d* of the intermediate member communicate through the openings 26 of the first and second walls 22 and 24 with the respective channels 36*a*, *b*, *c*, and *d* of the first and second connectors 14 and 16.

The first and second connectors 14 and 16 have an outer annular wall 70 having a plurality of spaced inwardly directed teeth 58 which are releasably received in associated notches 60 of the intermediate member 12 in order to releasably retain the first and second connectors 14 and 16 at a plurality of desired rotational position relative to the intermediate member 12. Thus, the first and second connectors 14 and 16 may be moved to a number of desired rotatable positions, such as eight, and may be releasably secured in place by tightening the bolt 52. At the same time, the first and second elastic walls 22 and 24 cause sealing between the intermediate member 12 and first and second connectors 14 and 16 to prevent leakage in the connection device 10. The first and second connectors 14 and 16 have an outer generally circular recess 62 to receive associated generally circular plates 64, with the plates 64 being retained in place in a suitable manner, such as by adhesive. The plate 64 of the first connector 14 has an aperture 66 to permit passage of the bolt 52 therethrough.

In use, the bolt 52 may be removed from the connection device 10 in order to readily disassemble the first and second connectors 14 and 16 and associated sleeves from the intermediate member 12, and permit easy assemblage of the first and second connectors 14 and 16 and the associated sleeves to the intermediate member 12 by securement of the bolt 52 in the connector device 10.

The foregoing detailed description is given for clearness of understanding only, and no unnecessary limitations should be understood therefrom, as modifications will be obvious to those skilled in the art.

What is claimed is:

1. A connection device, comprising:

an intermediate member having a pair of opposed first and second sides, and a plurality of spaced annular walls defining a plurality of separate annular channels extending substantially peripherally around the intermediate member;

first and second walls covering the opposed first and second sides of the intermediate member and closing and sealing the channels of the intermediate member, with each of the walls having opening means extending therethrough and separately communicating with each of the channels of the intermediate member;

a plurality of first conduits separately communicating with each of the channels of the intermediate member to permit passage of fluid to said channels;

a first connection positioned adjacent said first wall and having a plurality of annular walls defining separate annular channels extending substantially peripherally around the first connector, with each of the channels of the firs connector separately communicating with the opening means of the first wall such that the channels of the first connector separately communicate with said channels of the intermediate member, with said first connector being rotatable with respect to the intermediate member and with the first wall closing and sealing the channels of the first connector;

a plurality of second conduits separately communicating with each of the channels of the first connector to permit passage of fluid from said channels;

a second connector positioned adjacent said second wall and having a plurality of annular walls defining separate annular channels extending substantially peripherally around the second connector, with each of the channels of the second connector separately communicating with the opening means of the second wall such that the channels of the second connector separately communicate with said channels of the intermediate member, with said second connector being rotatable with respect to the intermediate member, with the second wall closing and sealing the channels of the second connector;

a plurality of third conduits separately communicating with each of the channels of the second connector to permit passage of fluid from said channels such that the first conduits separately communicate with the second and third conduits at the rotatable positions of the first and second connectors including means for releasably securing the first connector, intermediate member, and second connector together to permit relative rotation thereof.

2. The device of claim 1 wherein the first and second connectors, intermediate member, and first and second walls have a bore extending therethrough, and in which the securing means comprises an elongated bolt with said bolt received through said bores and having a threaded end, and in which the bore in one of said connectors has inner threads which cooperate with the threaded end of said bolt.

3. The device of claim 1 including means for releasably retaining the first and second connectors at a plurality of rotatable positions relative to the intermediate member.

4. The device of claim 3 wherein retaining means comprises a plurality of cooperating teeth and notches on the first and second connectors and the intermediate member.

5. The device of claim 2 wherein the first and second connectors have an outer wall having a plurality of inwardly directed teeth, and in which the intermediate member has a plurality of outer notches disposed to receive the said teeth at the rotatable positions.

6. The device of claim 1 wherein the first and second walls comprise an elastic member.

7. The device of claim 6 including means for retaining the first and second walls at a fixed position relative to the intermediate member.

8. The device of claim 6 wherein the retaining means comprises a pair of outwardly directed bosses on the intermediate member and an aperture in the first and second walls to receive the corresponding boss.

* * * * *